United States Patent [19]

Konig

[11] Patent Number: 4,991,282
[45] Date of Patent: Feb. 12, 1991

[54] PROCESS FOR ASSEMBLING VEHICLES

[75] Inventor: Helmut Konig, Ingolstadt, Fed. Rep. of Germany

[73] Assignee: Audi AG, Ingolstadt, Fed. Rep. of Germany

[21] Appl. No.: 511,937

[22] Filed: Apr. 16, 1990

Related U.S. Application Data

[63] Continuation of Ser. No. 212,834, Aug. 8, 1988, abandoned.

[30] Foreign Application Priority Data

Feb. 6, 1986 [DE] Fed. Rep. of Germany ....... 3603709

[51] Int. Cl.$^5$ .............................................. B23Q 17/00
[52] U.S. Cl. ......................................... 29/407; 29/430; 29/469; 29/772
[58] Field of Search .................. 29/407, 429, 430, 464, 29/468, 469, 772, 799, 784, 822, 824, 281.4, 281.5, 281.1; 296/72, 194, 197, 187, 56

[56] References Cited

U.S. PATENT DOCUMENTS

| | | | |
|---|---|---|---|
| 3,968,559 | 7/1976 | Karlsson | 180/168 |
| 4,604,797 | 8/1986 | Kitamura | 29/430 |
| 4,658,501 | 4/1987 | Fujii | 29/824 |
| 4,667,866 | 5/1987 | Tobita | 29/430 |
| 4,734,979 | 4/1988 | Sakamoto | 29/430 |
| 4,776,085 | 10/1988 | Shiiba | 29/824 |
| 4,813,529 | 3/1989 | Kawai | 29/824 |

FOREIGN PATENT DOCUMENTS

| | | |
|---|---|---|
| 0171576 | 7/1985 | European Pat. Off. . |
| 2511877 | 3/1974 | Fed. Rep. of Germany . |
| 3150476 | 12/1981 | Fed. Rep. of Germany . |
| 3337160 | 10/1983 | Fed. Rep. of Germany . |
| 3315646 | 10/1984 | Fed. Rep. of Germany . |
| 2185567 | 5/1973 | France . |

Primary Examiner—Timothy V. Eley
Assistant Examiner—J. Cuda
Attorney, Agent, or Firm—Lalos & Keegan

[57] ABSTRACT

A process for assembling vehicles having an integral body includes first mounting the components and subassemblies on an assembly frame and then moving them into position relative to the body of the vehicle so that connections can be made between the vehicle body and the components and subassemblies. After the connections have been made, the integral body with the components and subassemblies attached thereto can easily be lifted off the assembly frame. The assembly frame is easily adjustable to accommodate different types of vehicle bodies and easily holds the components and subassemblies in their proper position for connection to the vehicle body.

4 Claims, 2 Drawing Sheets

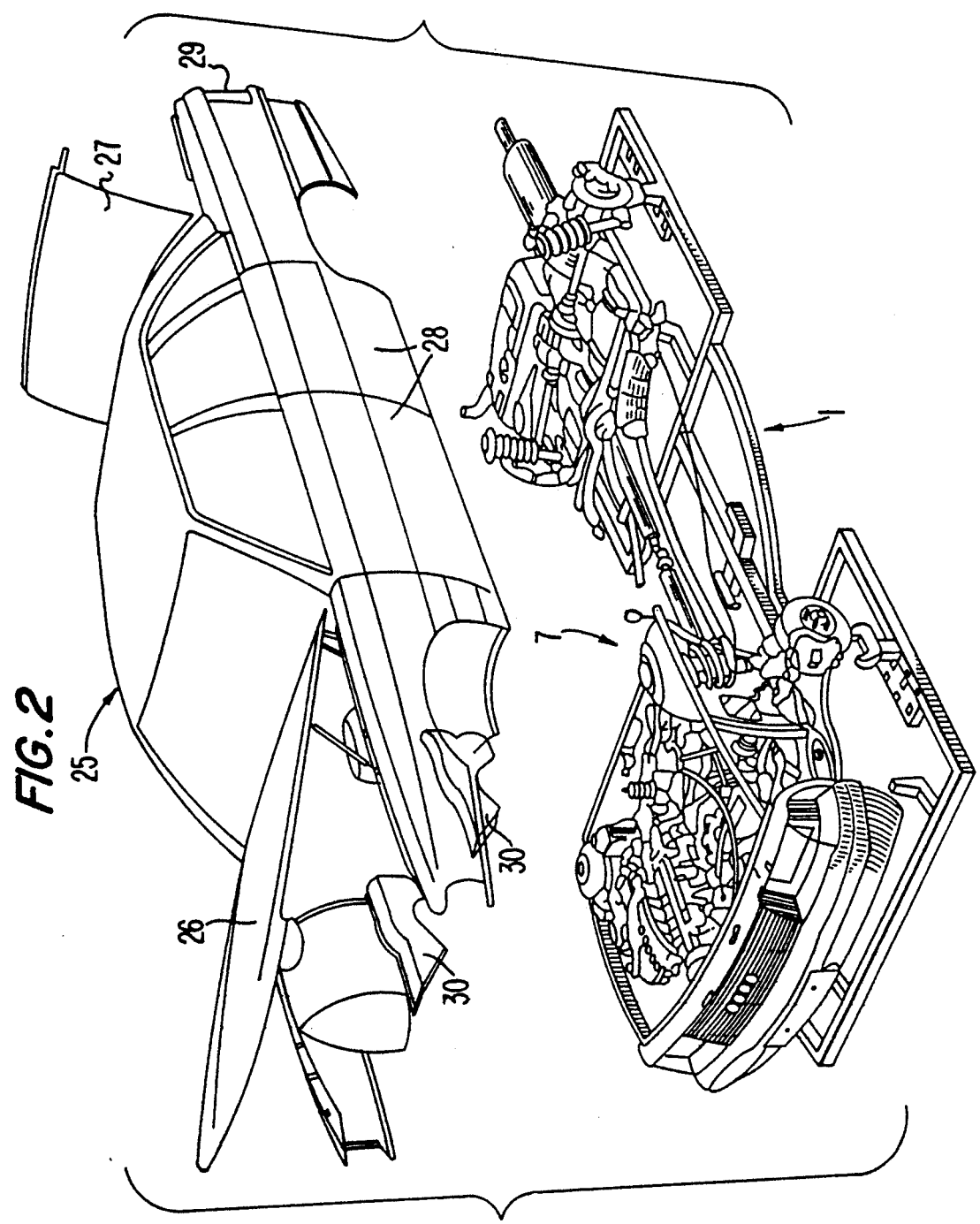

PROCESS FOR ASSEMBLING VEHICLES

This is a continuation of co-pending application Ser. No. 07/272,834 filed on 8 August 1988 abandoned.

BACKGROUND AND DISCUSSION OF THE INVENTION

The present invention relates to an apparatus and a process for assembling vehicles having an integral body, and more particularly automobiles wherein the components and subassemblies are placed on an assembly frame.

It has already been proposed in automobiles having an integral body and front-wheel drive to preassemble the drive unit, including the engine, the transmission and the front wheels together with the suspension and the steering, in the so-called front frame and then introduce this preassembled subassembly into the body from below and fasten it to the body. The further assembly with the body of chassis parts, the rear axle and additional body parts has to be carried out overhead. This further assembly of components and subassemblies is not only complicated, troublesome and time consuming but is not well suited to being performed by industrial robots or automatic auxiliary equipment. It also requires the use of a front frame which later forms an integral component of the vehicle.

German Patent No. 3,150,476 discloses an automatic assembly system for automobiles wherein the vehicle drive unit, the wheel carriers and the suspension system are preassembled on a horizontally moveable frame which is then moved under the vehicle body. Once there, the frame is lifted vertically into the body using a lifting table and is fastened to the body by means of tools arranged on the lifting table. With this system, the drive unit can be lifted vertically off the moveable frame and fastened to the body. However, the other components and subassemblies of the chassis must be attached individually and therefore must be brought into the proper position in relation to the preassembled drive unit. As a result, this assembly system cannot fully utilize the automatic assembly systems which are now available, such as robots or auxiliary equipment.

It would be desirable, therefore, to have an apparatus or device which could perform a process for assembling the components and subassemblies of a vehicle having an integral frame which would allow easier and more rapid assembly of the vehicle while at the same time making substantial use of robots or other auxiliary equipment to automate the process. Additionally, it would be desirable if none or very little of the assembly work has to be carried out overhead.

In the present invention, auxiliary automation equipment such as robots work essentially horizontally on the assembly frame and can readily mount the subassemblies and components in the assembly frame in their correct relative positions. During this part of the assembly process, no overhead work is necessary because the body is still missing. Because no overhead work is needed at this point, simpler and more cost-effective robots or auxiliary automation equipment can be used. More importantly, since the complete chassis only needs to be connected to the body at a few connection points, the resulting overhead work is substantially reduced and can be executed easily and without difficulty. This results in a very quick and economical process which produces uniform quality.

Another advantage of the present invention is that only a relatively short distance is necessary on the assembly line for carrying out the process of the present invention. If appropriate, the preassembly of the components and subassemblies on the assembly frame can be carried out as part of or separately from the final assembly line. The individual units and subassemblies can be fixed in their correct positions and attitudes even though there are no spacer parts of the subsequently finished vehicle, such as for example, between the front and the rear subassemblies.

After placing the components and subassemblies in the assembly frame it is expedient to proceed with moving the assembly frame with the parts vertically because these movements can be controlled easily and have short strokes. Also, the robots or auxiliary automation equipment does not have to be very complicated to do this, especially since it does not have to make any auxiliary connections between the assembly frame and the subassemblies and components thereon. Preferably these latter elements are secured in position on the assembly frame either as a result of their own weight, by means of a special positive connection, or by being supported against one another.

Another advantage of the present invention is that a testing step can be carried out between the assembly of the components and subassemblies (which comprise the chassis) on the assembly frame and the connection of the chassis to the body. The type of testing done can include a check of the assembled components and subassemblies and more specifically a check of their interaction. It also can include checks of final settings as well as functional tests and test runs which can include checking the track and kingpin angle settings, brake checks and complete test runs of the chassis with the engine running. Until now, this type of testing could only be performed after the fastening of the components and the subassemblies to the body. In the present invention, there is unimpeded access to the individual components of the chassis during testing, and if faulty parts or malfunctions occur, they can be eliminated quickly and easily because the body does not yet cause an obstruction and the connections to the body are not yet made.

The present invention also comprises a device or apparatus which is suitable for carrying out the assembly process. The assembly frame of the device is a fairly simple part which can be produced economically and which, in terms of design, can be coordinated with a specific vehicle type or with a product series based on that type. The position-securing elements of the assembly frame ensure that the components and subassemblies of the chassis can be placed on the assembly frame in the final positions they will have when connected to the body and to the other components. The longitudinal and transverse members of the frame also make it possible to access the components or subassemblies from the side or from below, if this is necessary. Access is, in any case, completely free from above or from the side.

Preferably the position-securing elements of the assembly frame utilize a vertically releasable positive connection. This has the advantage that the robots or auxiliary automation equipment used, does not have to make any connections between the assembly frame and the subassemblies and components to ensure that the components and subassemblies assume their appropriate final position. It is sufficient for proper assembly to simply place them on the assembly frame from above and lock them into position in such a way that, later after the final assembly of the body, they can be lifted upwards from the assembly frame as a complete unit.

A preferred embodiment of the assembly frame which is easily constructed uses stays as the position-securing elements. The length and arrangement of these stays can be predetermined for each type of vehicle in a relatively simple way using computing devices which are also responsible for the design and accommodation of the components and subassemblies in the body. These computing devices are programmed for the specific spatial coordinates of the components and subassemblies and therefore also contain the information on the supporting points on the assembly frame.

Fork-shaped rests can be mounted at certain points on the position securing elements of the assembly frame. This simple and economical construction ensures a good positive connection with the assembly frame under the deadweight of the components or subassemblies. Nevertheless, the assembly frame with the fork-shaped rests can be easily separated from the chassis through a rectilinear movement. Alternatively, releasable mountings, locking elements, clamp means or the like can be used for fixing other components, especially smaller components or components which are unstable in the composite structure as a whole and which are supported by the body in the final assembled vehicle and not by the other components or subassemblies.

The fork-shaped rests are especially useful with the adjustable stays since they both make it possible to use one assembly frame for many different types of vehicles or product series. The assembly frame has, for example, receiving holes which are located next to one another and into which each stay can be inserted, and thereby provide a matching assembly frame for each vehicle type. Moreover, mountings for the fork-shaped rests are displaceable laterally according to a coordinate shift, with the result that the position-securing elements can be set exactly to the desired bearing points. Also, the stays can be adjusted telescopically so that they can be brought into the desired position.

Preferably, the assembly frame, together with the preassembled chassis, can be moved to the body simply due to the adjustability of the position-securing elements. Conversely, it is also possible for the assembly frame merely to be moved under the body before the body is placed on it from above. The robots or auxiliary automation equipment which are used to mount the components and subassemblies on the assembly frame to form the chassis can also be programmed appropriately so that they can be used to make the connections between the chassis and the body. Preferably, free passages are left for robots, auxiliary automation equipment or tools between the members of the assembly frame for easy access to the components and subassemblies of the chassis. By having these free passages, easy access to the connection points where the ready-assembled chassis is to be connected to the body is maintained.

Other details, objects and advantages of the present invention will become more readily apparent from the following description of a presently preferred embodiment thereof.

BRIEF DESCRIPTION OF THE DRAWINGS

In the accompanying drawings, a preferred embodiment of the invention is illustrated, by way of example only, wherein.

DETAILED DESCRIPTION OF THE PREFERRED EMBODIMENT

Figure 1:
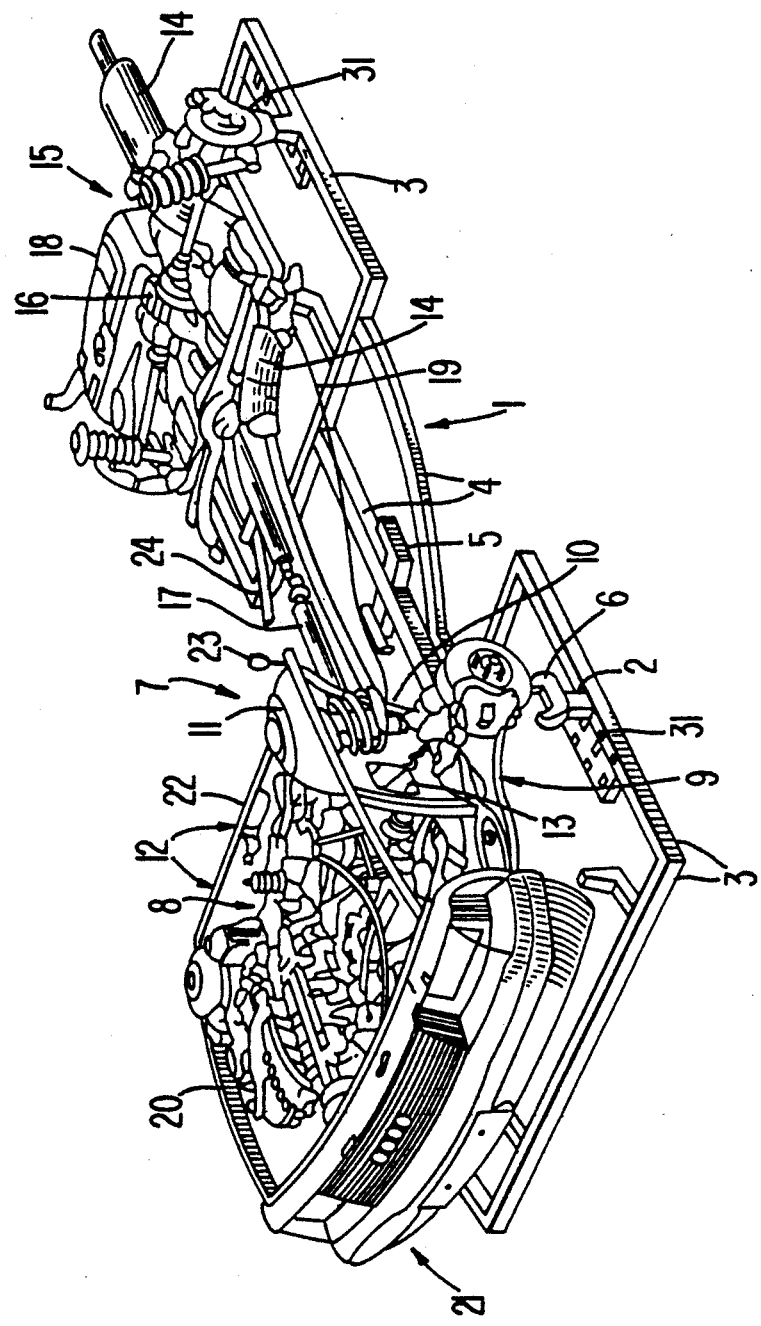
FIG. 1 shows a perspective view of an assembly frame fitted with components and subassemblies; and, FIG. 2 illustrates the step of bringing the body together with the components and subassemblies which have been positioned on the assembly frame.

As shown in FIG. 1, a complete chassis 7 is ready-assembled on an assembly frame 1 of a template-like type which in its contour corresponds essentially to the contour of an integral body to which it will be mounted subsequently. The assembly frame is composed of a plurality of longitudinal members 3, a plurality of transverse members 4 and a plurality of position-securing elements 2 and 5. The position-securing elements 2 and 5 are, for example, stays or brackets which project vertically upwards from the assembly frame 1. Some of the stays 2 are equipped with fork-shaped rests 6, upon which the components and subassemblies of the chassis 7 are secured in the proper position substantially due to their own weight. Instead of the fork-shaped rests 6, clamps, locking means or other retaining elements could be used. Preferably the position-securing elements are easily releasable as a result of vertical movements. They also serve to hold or retain any smaller or unstable components which are not supported by other components while the chassis is not fastened to the body. The position-securing elements 2 and 5 are inserted, for example, in locking holes 31 provided in the assembly frame 1. Preferably several locking holes 31 are provided next to one another for the repositioning of the position-securing elements 2.

The chassis 7 preferably comprises the following components and subassemblies. A drive unit 8 with a complete engine forms one subassembly, to which is flanged the transmission equipped with its cardan shafts and pivot bearings. Also mounted on the drive unit 8 is an auxiliary frame (not shown) which in the finished vehicle forms an integral component therewith. Furthermore, depending on the type of equipment used in the vehicle, the drive unit can also include a compressor for an air-conditioning system or similar auxiliary equipment (not shown). Moreover, arranged on the assembly frame 1 are the complete suspension system comprising longitudinal members 9 with telescopic-strut holders 11 and the telescopic struts 10. Each of these can be a separately preassembled subassembly. The left-hand and right-hand engine line sets 12 are also already preassembled on the assembly frame 1. Furthermore, a steering gear 13 is fitted by means of its connections to the wheel carriers and the support, for example to the longitudinal member 9. The complete exhaust system is also supported on the assembly frame 1 and is connected to the drive unit. It includes the muffler and, if appropriate, a catalytic converter 14. Also premounted on the assembly frame 1 is a complete rear axle 15 which depending on the vehicle type can also include a differential 16. The drive connection between the drive unit 8 and the rear axle 15 is made by means of a cardan shaft 17, the mountings of which are already positioned on the assembly frame 1 in the subsequent correct position. Furthermore, a fuel tank 18 is placed on the assembly frame 1 in the correct position it will have in the assembled integral body. Fuel lines and brake lines 19 are likewise already laid and connected. Fuel preparation devices assigned to the engine 8, such as, for example, a flow divider 20, are likewise preassembled, as are the accessories required for cooling. Moreover, the preassembled front end 21 is secured in position on the assembly frame 1 and is connected to the other subassemblies and/or components. Preferably the front end comprises the air scoop, the front radiator or supercharge cooler in a supercharged engine, the headlamps, ornamental grills, shock absorbers, front spoilers and the like. If appropriate, a water tank for the headlamp cleaning system can likewise be inserted. Finally, injection-molded and end-wall components 22 as well as a gear-shift mechanism 23 and a hand brake 24 are also inserted. The fluids used in the vehicle such as coolant, oil, transmission oil, brake fluid, cleaning fluids and the like, can also be provided as part of the components and subassemblies mounted on assembly frame 1.

After the chassis 7 has been preassembled with the above-mentioned components, any necessary testing can be done. For example, the track and kingpin angles are set, test runs of the entire chassis 7 as well as functional tests of the individual components are conducted. Faults or malfunctions which are found can be eliminated quickly and easily because of the accessibility of the components and subassemblies.

As shown in FIG. 2, either the assembly frame 1, together with the ready-assembled chassis 7 containing the components and subassemblies, is then moved under an already prepared body 25, to which a front hood 26, a tailgate 27 and doors 28 have already been fastened. Alternatively, the body 25 is moved over the assembly frame 1. Additional body parts 30 can also be fastened or at least provided in the body 25. The rear lights 29 are appropriately likewise already provided in the body 25. The body 25 and the assembly frame 1 are then brought together, and the few connections necessary to mount the chassis 7 in the body 25 to form an integral body are made. For this purpose, robots or other auxiliary automation equipment can reach through openings in the assembly frame 1. After the chassis 7 has been connected to the body 25, the assembled vehicle is lifted off the assembly frame 1 in the vertical direction. Alternatively, the assembly frame 1 can be lowered from the assembled vehicle. In either case, the connections between the chassis and the assembly frame 1 come loose automatically.

While a presently preferred embodiment of practicing the invention has been shown and described with particularity in connection with the accompanying drawings, the invention may otherwise be embodied within the scope of the following claims.

What is claimed is:

1. A method of assembling a vehicle having an integral body and components and subassemblies fastened to said integral body comprising:
   positioning said components and subassemblies in their final positions relative to each other on an assembly frame;
   interconnecting selected numbers of said components and subassemblies positioned on said assembly frame into operable conditions;
   conducting operational tests on selected numbers of said components and subassemblies positioned on said assembly frame unimpeded by said integral body;
   mixing required adjustments to selected numbers of said components and subassemblies positioned on said assembly frame unimpeded by said integral body;
   vertically aligning said integral body and said assembly frame with said assembly frame disposed beneath said integral body;
   displacing said integral body and said assembly frame vertically together to position said components and subassemblies in their final positions relative to said integral body;
   fastening selected numbers of said components and subassemblies on said assembly frame onto said integral body; and
   removing said assembly frame from beneath said integral body whereby said components and subassemblies will be fastened to said integral body in operative conditions.

2. A method according to claim 1 including fastening additional components to said integral body.

3. A method according to claim 1 wherein said components and subassemblies are positioned on said assembly frame by means of auxiliary automated equipment.

4. A method according to claim 1 wherein said components and subassemblies are fastened to said integral body by means of auxiliary automated equipment.

* * * * *

UNITED STATES PATENT AND TRADEMARK OFFICE
CERTIFICATE OF CORRECTION

PATENT NO. : 4,991,282

DATED : February 12, 1991

INVENTOR(S) : Helmut Konig

It is certified that error appears in the above-identified patent and that said Letters Patent is hereby corrected as shown below:

Claim 1, line 18, delete "mixing" and insert --making--.

Signed and Sealed this

Thirtieth Day of June, 1992

Attest:

DOUGLAS B. COMER

Attesting Officer

Acting Commissioner of Patents and Trademarks